US007988126B2

(12) United States Patent
Hoppe et al.

(10) Patent No.: US 7,988,126 B2
(45) Date of Patent: Aug. 2, 2011

(54) ELECTROMAGNETIC ACTUATION UNIT

(75) Inventors: Jens Hoppe, Erlangen (DE); Stefan Konias, Nuremberg (DE); Christoph Ross, Bamberg (DE)

(73) Assignee: Schaeffler KG, Herzogenaurach (DE)

( * ) Notice: Subject to any disclaimer, the term of this patent is extended or adjusted under 35 U.S.C. 154(b) by 292 days.

(21) Appl. No.: 12/440,333

(22) PCT Filed: Aug. 22, 2007

(86) PCT No.: PCT/EP2007/058707
§ 371 (c)(1),
(2), (4) Date: Mar. 19, 2009

(87) PCT Pub. No.: WO2008/028801
PCT Pub. Date: Mar. 13, 2008

(65) Prior Publication Data

US 2010/0025606 A1 Feb. 4, 2010

(30) Foreign Application Priority Data

Sep. 8, 2006 (DE) ........................ 10 2006 042 214

(51) Int. Cl.
*F16K 31/02* (2006.01)

(52) U.S. Cl. .................................. 251/129.15; 335/297

(58) Field of Classification Search ............. 251/129.01, 251/129.15; 335/296, 297
See application file for complete search history.

(56) References Cited

U.S. PATENT DOCUMENTS

| | | | | |
|---|---|---|---|---|
| 5,310,160 | A * | 5/1994 | Harck et al. | 251/129.15 |
| 6,969,043 | B2 * | 11/2005 | Hirata et al. | 251/129.15 |
| 7,017,885 | B2 * | 3/2006 | Hirata et al. | 251/129.15 |
| 7,069,951 | B2 | 7/2006 | Cornea | |
| 7,124,998 | B2 * | 10/2006 | Steinruck et al. | 251/129.21 |
| 7,533,687 | B2 * | 5/2009 | Uemura et al. | 137/375 |
| 2003/0087536 | A1 | 5/2003 | Ito et al. | |
| 2004/0041114 | A1 | 3/2004 | Hirata et al. | |

FOREIGN PATENT DOCUMENTS

| | | | |
|---|---|---|---|
| DE | 198 23 968 | Y | 12/1999 |
| DE | 100 56 200 | Y | 7/2001 |
| GB | 956 668 | A | 4/1964 |
| WO | 00/34966 | Y | 6/2000 |

* cited by examiner

*Primary Examiner* — John K Fristoe, Jr.
(74) *Attorney, Agent, or Firm* — Lucas & Mercanti, LLP

(57) ABSTRACT

The invention relates to an electromagnetic actuation unit (2) of a hydraulic valve (1), with a housing (14), a closing body (**4*b*) and a sealing element (6), the closing body (4*b*) being plugged into an insertion opening (14*a*) of the housing (14), the sealing element (6) bearing against the closing body (4*b*) and the housing (14**) and protecting the interior of the actuation unit against the ingress of media.

3 Claims, 3 Drawing Sheets

ELECTROMAGNETIC ACTUATION UNIT

FIELD OF THE INVENTION

The invention relates to an electromagnetic actuation unit of a hydraulic valve.

Hydraulic valves of this type, for example proportional directional valves, are used in internal combustion engines, for example, for the activation of hydraulic camshaft adjusters or of switchable cam followers. The hydraulic valves consist of an electromagnetic actuation unit and of a valve portion. The valve portion constitutes the hydraulic portion of the directional valve, this having formed on it at least one inflow connection, at least one working connection and a tank connection. By means of the electromagnetic actuation unit, specific connections of the valve portion can be hydraulically connected to one another in a directed manner and therefore the pressure-medium streams guided.

A hydraulic valve of this type is disclosed, for example in DE 10 2004 025 969 A1. The hydraulic valve has a valve portion and an electromagnetic actuation unit.

The electromagnetic actuation unit of this hydraulic valve comprises, within a housing, a first magnet yoke, a coil arranged on a coil former, a second magnet yoke, an armature and a closing body.

The coil and the first and the second magnet yoke are arranged coaxially to one another within the housing of the electromagnetic actuation unit. The first and the second magnet yoke are in this case offset with respect to one another in the axial direction. The armature is located in the region between the first and the second magnet yoke radially within the first magnet yoke and is surrounded in the radial direction by the coil. The armature, the housing and the first and the second magnet yoke form a flux path for the magnetic flux lines which are caused by the application of current to the coil.

The valve portion consists of a valve housing and of a control piston arranged axially displaceably in the latter. The valve housing is arranged within a reception orifice of the second magnet yoke and is connected at a fixed location to the latter. Three pressure-medium connections are formed on the outer surface area of the valve housing. A control piston is arranged axially displaceably inside the valve housing, the outside diameter of the control piston being adapted to the inside diameter of the valve housing. Furthermore, on the control piston, control portions are formed, by means of which adjacent pressure-medium connections can selectively be connected to one another or separated from one another as a function of the relative position of the control piston with respect to the valve housing.

By current being applied to the coil, the armature is urged in the direction of the second magnet yoke, this movement being transmitted by means of a tappet pushrod mounted on the armature to the control piston. The latter is then moved in the axial direction into a defined position counter to a spring supported on the valve housing, and the pressure-medium streams within the hydraulic valve are thus controlled.

On the side which faces away from the valve portion, the housing has an insertion opening, into which the closing body is inserted, a plug connection which is formed on the closing body protruding out of the housing. An annular groove, in which an annular seal is arranged, is formed on the closing body. The annular seal bears sealingly on one side against the housing and on the other side against the closing body. In this embodiment, the high assembly expenditure of the closing body in the housing and the low process reliability of this process are disadvantageous. In order for it to be possible for it to bear sealingly against the closing body and the housing, the external diameter of the sealing ring has to be configured to be greater than the internal diameter of the housing; during assembly, there is the risk in the embodiment that the sealing ring is forced at least partially out of the annular groove while it is dipping into the housing. The sealing ring can become clamped between the closing body and the housing, in the worst case even shear off, which leads to a leak at this point.

SUMMARY OF THE INVENTION

The object on which the invention is based is, therefore, to avoid these disadvantages outlined and therefore to provide an electromagnetic actuation unit of a hydraulic valve, in which its assembly outlay is to be minimized and have greater process reliability. In this case, the production costs are not to be adversely influenced.

According to the invention, the object is achieved in that the electromagnetic actuation unit of a hydraulic valve has at least one housing, one closing body and one sealing ring, the sealing ring being arranged in an annular groove which is formed on the closing body, the closing body being plugged into an insertion opening of the housing, the housing having a sleeve-shaped region which, starting from the insertion opening of the housing, has a first and a second adjacent axial region, the internal diameter of the first region being configured to be greater than the internal diameter of the second region, the sealing ring bearing against the closing body and the second region of the housing, and the first region merging into the second region by means of an insertion bevel.

In an actuation unit according to the invention, the components which cause the actuating movement of the actuation unit, for example a coil and an armature, are arranged within a housing. In order to protect these components against aggressive media, for example engine oil or spray water, an insertion opening of the housing is closed sealingly by means of a closing body and a sealing element which is arranged between the closing body and the housing. The closing element can be, for example, a magnet yoke or a part of a coil body. Starting from the insertion opening which is to be closed, the magnet housing is configured with two regions of different internal diameter. Here, the insertion opening is adjoined directly by a region of relatively great diameter which merges into a region of relatively small internal diameter by means of an inclined insertion bevel. The external diameter of the closing body is adapted to the internal diameter of the region of relatively small internal diameter. During assembly, the sealing element is positioned in an annular groove which is formed on an outer circumferential face of the closing body, and the closing body is plugged into the insertion opening. The sealing element then first of all dips into the region of relatively great internal diameter. The sealing element ideally does not come into contact with the inner wall of the housing in this region. There is at least only slight overlapping, as a result of which the sealing element is guided on the inner circumferential face of the first region, which guidance does not lead to clamping or even shearing off. The guidance is continued in the region of the insertion bevel, as a result of which the sealing element is moved reliably to its intended location, into the second region of the housing. At this location, the sealing element produces its sealing action in conjunction with the inner circumferential face of the housing and an outer circumferential face of the closing element. During the transition from the first region via the bevel, the sealing element is deformed plastically, but is then prevented by the inner wall of the first region of the housing from emerging from the annular groove counter to the insertion direction.

There is provision in one advantageous development of the invention for the housing to be configured as a formed sheet-metal part which is manufactured without cutting.

There can be provision here for the external diameter of the first region to correspond to the external diameter of the second region.

The configuration of the housing as a sheet-metal part which is formed without cutting, for example by means of a deep-drawing process, represents an inexpensive manufacturing process with high accuracy. The housing, including the two regions of different internal diameter and the insertion bevel, can be manufactured in one work process by means of this manufacturing process, without expensive material-removing post-treatment being required. The complexity of the component is reduced further by the configuration of the housing with identical external diameters in the two regions.

There is provision in one specific refinement of the invention for the internal diameter of the first region to be configured to be greater than the external diameter of the sealing ring but smaller than the external diameter of the closing body increased by the radial thickness of the material of the relieved sealing element.

As a result of this measure, the sealing element is not deformed plastically until it dips into the region of the insertion bevel, the wall of the first region of the housing preventing the sealing element which is arranged on the closing body from migrating undesirably or shearing off.

BRIEF DESCRIPTION OF THE DRAWINGS

Further features of the invention may be gathered from the following description and from the drawings which illustrate an exemplary embodiment of the invention in simplified form and in which.

DETAILED DESCRIPTION OF THE DRAWING

Figure 1:
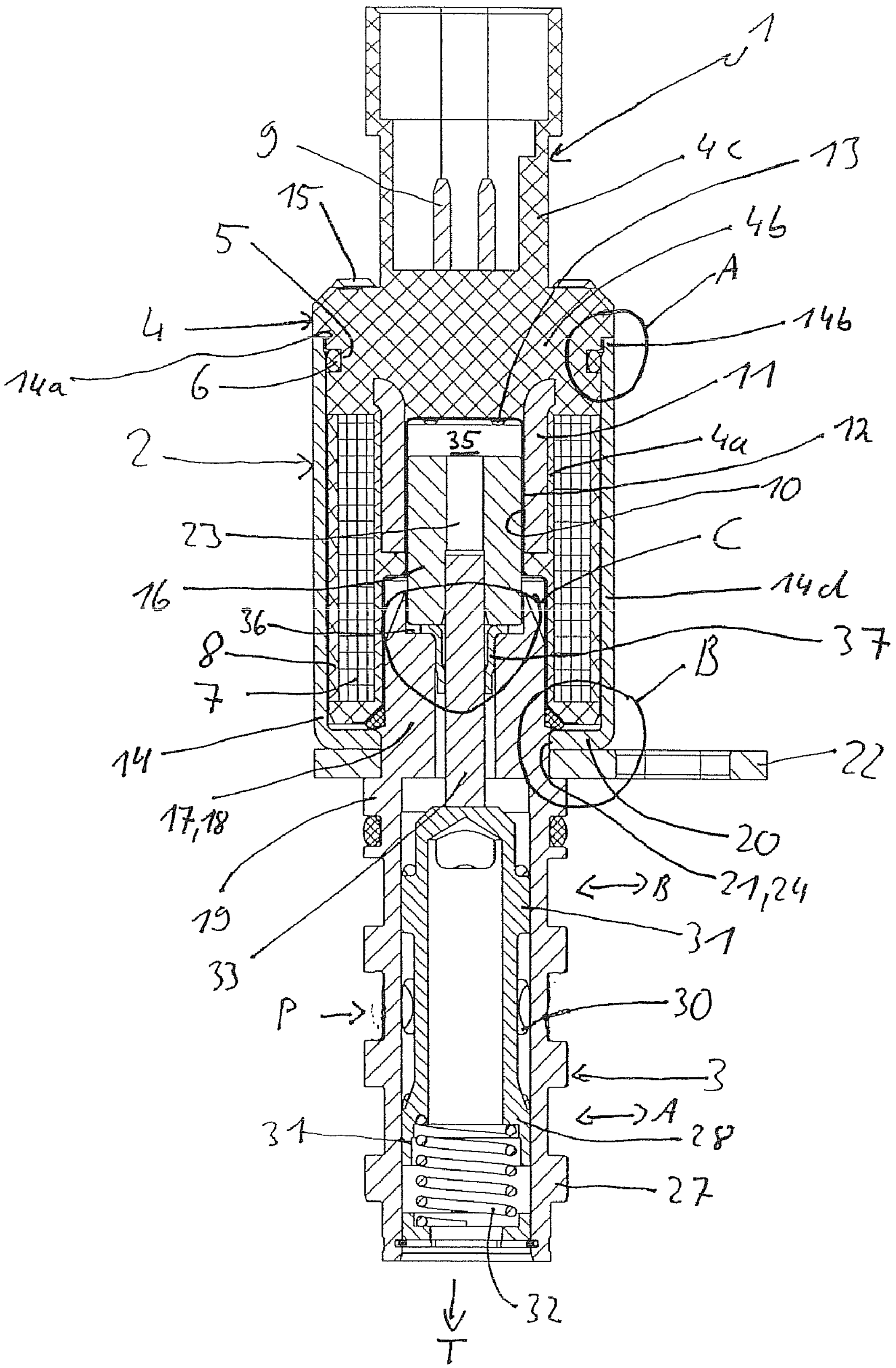
FIG. 1 shows an embodiment of an electromagnetic actuation unit according to the invention of a hydraulic valve by the example of a 4/3-way proportional valve.

FIG. 1 shows an embodiment of an electromagnetic actuation unit 2 according to the invention by the example of a hydraulic valve 1 designed as a 4/3-way proportional valve. Applications of the actuation unit 2 according to the invention in other hydraulic valves, such as 3/2-way proportional valves or switching valves, may likewise be envisaged.

The hydraulic valve 1 has an electromagnetic actuation unit 2 and a valve portion 3.

The electromagnetic actuation unit 2 has a coil former 4. The coil former 4 is composed of a coil carrier 4*a*, of a closing body 4*b* and of a connecting element 4*c*.

The coil carrier 4*a* carries a coil 7 consisting of a plurality of turns of a suitable wire. The radially outer surface area of the coil 7 is surrounded by a sleeve-shaped material layer 8 which consists of a non-magnetizable material. The material layer 8 may consist, for example, of a suitable plastic and may be injection-moulded onto the wound coil 7.

An electrical plug connection 9, via which the coil 7 can be acted upon by current, is received within the connecting element 4*c*.

Figure 2:
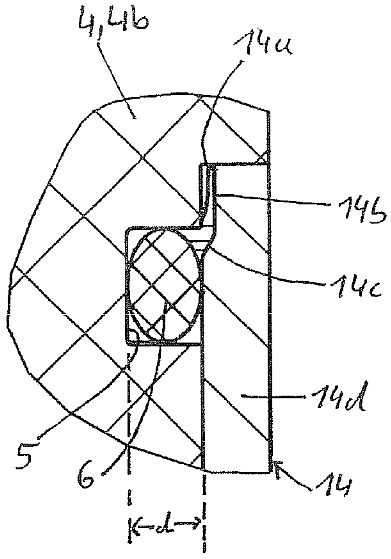
FIG. 2 shows the detail A from FIG. 1.

The coil former 4 is arranged at least partially within a housing 14 of pot-shaped design. In the embodiment illustrated, the coil carrier 4*a* and a part-region of the closing body 4*b* are located within the housing 14. The housing 14 has a bottom 20, opposite which an introduction orifice 14*a* lies in the axial direction. Furthermore, starting from the introduction orifice 14*a* the housing 14 has a first axial region 14*b* of smaller wall thickness, which merges in the axial direction via an introduction chamfer 14*c* into a second region 14*d* of larger wall thickness. In this case, the inside diameter of the housing 14 is designed to be larger in the first region 14*b* than the inside diameter of the second region 14*d*. During assembly, the coil former 4 can be introduced into the housing 14 via the introduction orifice 14*a*. In this embodiment, the closing body 4*b* is assigned the task of protecting the interior of the actuation unit 2 against the penetration of aggressive media via the introduction orifice 14*a*. For this purpose the outside diameter of the closing body 4*b* is adapted essentially to the inside diameter of the second region 14*d* of the housing 14. In addition an annular groove 5, in which a sealing element 6 is arranged, is formed on an outer surface area of the closing body 4*b*. The sealing element 6 may be designed, for example, as a sealing ring consisting of an elastomer. The sealing element 6 bears, on the one hand, against the boundary faces of the annular groove 5 and, on the other hand, against the inner surface area of the second region 14*d* of the housing 14 (FIG. 2). A sealing point between the closing body 4*b* and the housing 14 is thereby implemented, with the result that the penetration of aggressive media into the interior of the actuation unit 2 at this point is effectively prevented.

During the mounting of the coil former 4 in the housing 14, the sealing element 6 is first inserted into the annular groove 5. The coil former 4 is subsequently introduced into the housing 14 via the introduction orifice 14*a*. This operation is appreciably simplified by the first region 14*b* of the housing 14 being designed with a larger outside diameter. First, the sealing ring 6 penetrates into the first region 14*b* of larger inside diameter. The inside diameter of this region 14*b* is designed to be larger than the outside diameter of the sealing element 6. This prevents the sealing element 6 from coming to bear along its entire circumference against the inner wall of the first region 14*b* and therefore prevents a force directed counter to the introduction movement from being exerted on the sealing element. In the region of the introduction chamfer 14*c*, the sealing element 6 comes to bear on its entire circumference against the housing 14, with the result that this circumference is deformed plastically. By the introduction chamfer 14*c* being formed between the first and the second region 14*b, d* of the housing 14, damage to the sealing element 6 during the transfer from the first to the second region 14*b,d* is effectively prevented. If the inside diameter of the first region 14*b* of the housing 14 is designed to be smaller than the outside diameter of the closing body 4*b*, increased by the amount of the radial thickness d of the material of the sealing element 6 in the expanded state, an egress of the sealing element 6 out of the annular groove 5 and, consequently, shearing-off are effectively prevented.

At the introduction orifice of the housing 14, tabs 15 are formed which first extend in the axial direction and which project beyond a step of the closing body 4*b* in the axial direction and surround it at least partially in the radial direction. The coil former 4 is thus fixed firmly within the housing 14.

The housing 14 may be manufactured, for example, by means of a cost-effective non-cutting forming process, for example a deep-drawing method, from a suitable blank, for example a suitable sheet metal part.

The coil former 4 is designed with an essentially cylindrical blind-hole-like recess 10 which is formed concentrically to the coil 7. Furthermore, the coil former 4 receives, at the bottom end of the recess 10, a first magnet yoke 11 of sleeve-shaped design. Within the recess 10 is arranged a pot-shaped armature guide sleeve 12 which defines an armature space. The bottom end of the armature guide sleeve 12 is provided with stops 13 extending axially inwards. Furthermore, the armature guide sleeve 12 extends along the entire recess 10 in the axial direction and at least partially surrounds the coil former 4 at its orifice in the radial direction.

An armature 16 is arranged displaceably in the axial direction within the armature guide sleeve 12. The outside diameter of the armature 16 is adapted to the inside diameter of the armature guide sleeve 12, thereby implementing a mounting of the armature 16 in the armature guide sleeve 12. The displacement travel of the armature 16 is limited in one direction by the stops 13 and in the other direction by a second magnet yoke 17.

The armature 16 separates the armature space defined by the armature guide sleeve 12 into a first and a second subspace 35, 36. The first subspace 35 extends between the bottom of the armature guide sleeve 12 and the armature 16. The second subspace 36 extends between the second magnet yoke 17 and the armature 16. The armature 16 has a bore 23 which runs in the axial direction and via which the two sub-spaces 35, 36 separated by the armature 16 communicate with one another. In the embodiment illustrated, this bore 23 is designed as centric bore which runs along the longitudinal axis of the armature 16.

The second magnet yoke 17 has a tubular portion 18 and an annular portion 19 adjoining the latter in the axial direction. The tubular portion 18 extends through an orifice 21, formed in the bottom 20 of the housing 14, into the armature guide sleeve 12. In this case, the outside diameter of the tubular portion 18 is adapted to the diameter of the orifice 21, with the exception of play which may possibly be present.

The housing 14 is supported on the annular portion 19 via a mounting flange 22. The mounting flange 22 serves for fastening the hydraulic valve 1 to a surrounding structure, not illustrated, for example a cylinder-head cover.

Figure 3:
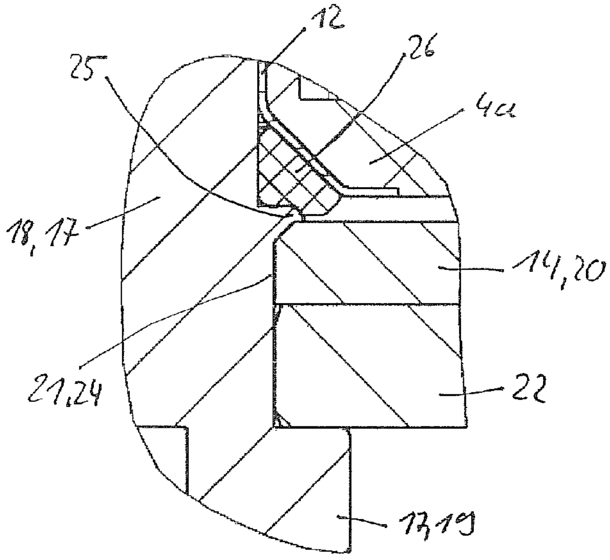
FIG. 3 shows the detail B from FIG. 1.

FIG. 3 illustrates the connection point between the housing 14 and the second magnet yoke 17. This is a caulking 25. This may be implemented, for example, in that, after the positioning of the mounting flange 22 and of the housing 14 on the second magnet yoke 17, material is displaced from the outer circumferential face of the second magnet yoke 17 in the axial direction towards the housing 14 and is introduced, form-filling, into the connection point between these components. In this case, material accumulations are formed on the tubular portion 18 in the region of the connection point and extend outwards in the radial direction beyond an edge 24 of the orifice 21. In addition to a positive connection between the housing 14 and the second magnet yoke 17, non-positive connections are made at the same time between these components and the mounting flange 22 arranged between them.

Furthermore, the housing 14 and the mounting flange 22 are centred with respect to the second magnet yoke 17 by means of this connection method. During the caulking operation, material of the second magnet yoke 17 is forced into the interspace between these components and the play is thus eliminated.

Between the tubular portion 18 of the second magnet yoke 17 and the armature guide sleeve 12 is arranged a sealing ring 26. This prevents lubricant in the armature guide sleeve 12 from reaching the coil former 4, thereby protecting the latter against damage caused by the lubricant.

As can be seen in FIG. 1, the valve portion 3 of the hydraulic valve 1 designed as a 4/3-way proportional valve consists of a valve housing 27 and of a control piston 28. In this embodiment, the valve housing 27 is formed in one piece with the second magnet yoke 17. However, embodiments in which the valve housing 27 is formed as a separate component and is connected at a fixed location to the second magnet yoke 17 may also be envisaged.

A plurality of pressure-medium connections A, B, P are formed on the outer surface area of the valve housing 27 and communicate via clearances 30 with the interior of the valve housing 27 of essentially hollow-cylindrical design. In addition, the orifice, facing away from the electromagnetic actuation unit 2, of the valve housing 27 serves as an outflow connection T. The middle pressure-medium connection P, which serves as an inflow connection, communicates via a pressure-medium line, not illustrated, with a pressure-medium pump, likewise not illustrated. The two outer pressure-medium connections A, B serve as working connections. The outflow connection T communicates with a pressure-medium reservoir, likewise not illustrated.

A control piston 28 is arranged axially displaceably within the valve housing 27. Control portions 31 in the form of annular webs are formed on the outer surface area of the control piston 28. The outside diameter of the control portions 31 is adapted to the inside diameter of the valve housing 27. By a suitable axial positioning of the control piston 28 in relation to the valve housing 27, adjacent pressure-medium connections A, B, P can be connected to one another. The working connection A, B in each case not connected to the inflow connection P is at the same time connected to the tank connection T.

In this embodiment, the valve housing/second magnet yoke component 27, 17 consists of a suitable magnetizable steel. The component can thus fulfil all the required functions, such as the guidance of the control piston 28, and influencing of the magnetic field as part of the magnetic circuit and as a tie-up member between the hydraulic and the magnetic part of the hydraulic valve 1.

Figure 4A:
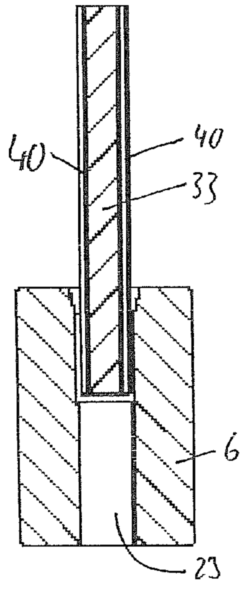
FIG. 4*a* shows a perspective illustration of the armature/tappet pushrod system.
Figure 4B:
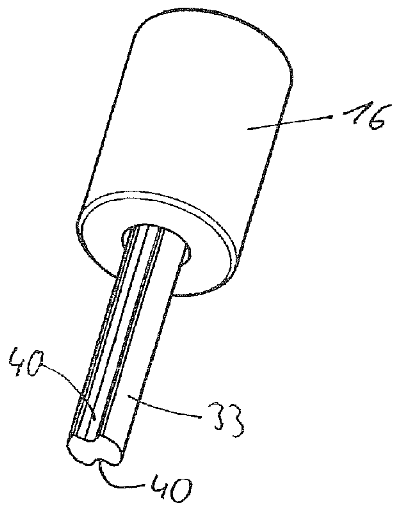
FIG. 4*b* shows a longitudinal section through the armature/tappet pushrod system.
Figure 5:
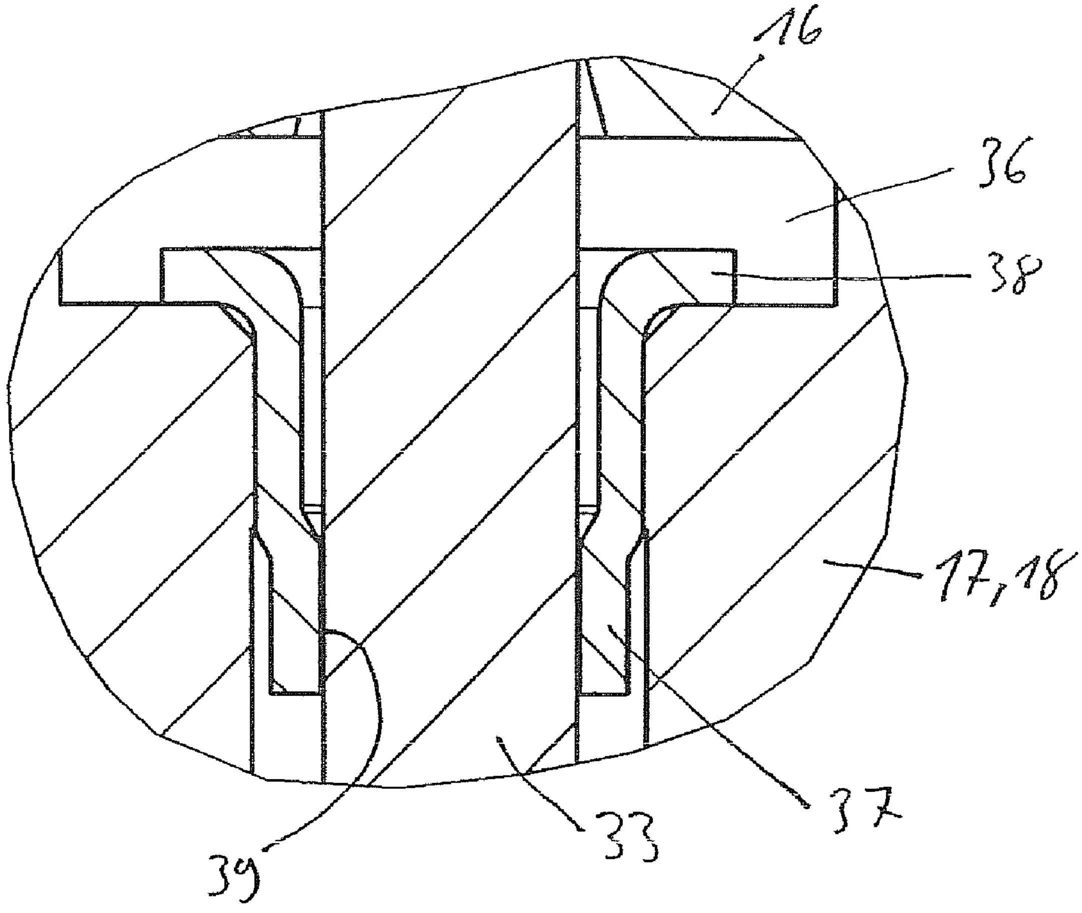
FIG. 5 shows the detail C from FIG. 1.

The control piston 28 is acted upon at one end by the force of a spring element 32 in the direction of the electromagnetic actuation unit 2. A tappet pushrod 33 bears against the other axial end of the control piston 28 and extends through a sliding sleeve 37 arranged in a bore of the second magnet yoke 17 (FIG. 5). That end of the tappet pushrod 33 which faces away from the control piston 28 engages into the bore 23 of the armature 16 and is connected firmly to the latter (FIG. 4*a*). The connection between the armature 16 and tappet pushrod 33 may, for example, be of a positive, non-positive or materially integral type. A movement of the armature 16 is therefore transmitted directly to the tappet pushrod 33 and consequently to the control piston 28.

The sliding sleeve 37 may be produced, for example, by means of a non-cutting forming method from a sheet metal blank of a non-magnetizable material.

In the embodiment illustrated, the armature-side end of the sliding sleeve 37 is provided with an annular rim 38 running in the radial direction (FIG. 5). The rim 38 serves, on the one hand, as a mounting stop which co-operates with the armature-side end of the second magnet yoke 17. Furthermore, the said rim defines a minimum distance which the armature 16 can assume in relation to the second magnet yoke 17, thus preventing direct contact between these components. A bearing face 39 is formed at the end of the sliding sleeve 37 which faces away from the armature 16. The bearing face 39 is adapted in this region essentially to the outer surface area of the tappet pushrod 33. The bearing face 39 and the outer surface area of the tappet pushrod 33 form an additional bearing point, via which the armature/tappet pushrod system 16, 33 is additionally mounted.

In addition, the outer surface area of the tappet pushrod 33 is adapted, at least in the region of its engagement into the bore 23 of the armature 16, essentially to the inner surface area of the bore 23.

Contrary to this in the exemplary embodiment illustrated, two grooves 40 running axially are introduced (FIGS. 4*a, b*) into the outer surface area of the tappet pushrod 33 and extend along the entire length of the tappet pushrod 33. Embodiments with only one, three or more than three grooves 40 may also be envisaged. By means of the grooves 40, lubricant can pass from the valve portion 3 via the bearing point on the sliding sleeve 37 into the armature space. At the same time, the grooves 40 communicate with the bore 23, with the result that lubricant can be transported to and fro between the two subspaces 35, 36. In addition, in this way, pressure compensation between the subspaces 35, 36 can take place when the armature 16 moves axially.

Since the outer surface area of the tappet pushrod 33 is adapted to the bearing face 39 of the plain bearing in the region of the bearing point, with the exception of the grooves 40, a relatively large area is available for mounting the tappet pushrod 33. Damage to the bearing face 39 during operation is thereby avoided. At the same time, a robust mounting of the armature/tappet pushrod system 16, 33 is made possible over the large bearing face 39, and a constant inflow of lubricant to the bearing point is ensured via the grooves 40.

Since, furthermore, the outer surface area of the tappet pushrod 33 which projects into the bore 23 is adapted to the inner surface area of the bore 23, with the exception of the grooves 40, on account of the relatively large overlap area a robust non-positive connection can be made cost-effectively by the tappet pushrod 33 being pressed into the armature 16. Pressure compensation between the two subspaces 35, 36 is at the same time made possible via the grooves 40 and the continuous bore 23.

This embodiment constitutes a cost-effective and simple-to-produce solution for mounting the armature/tappet pushrod system 16, 33 at the same time with the routing of lubricant into and within the actuation unit 2.

In the embodiment illustrated, the tappet pushrod 33 is a solid component, with the result that the robustness of the actuation unit 2 is markedly increased. The tappet pushrod 33 may be produced cost-effectively by means of a non-cutting forming method from a suitable blank. Suitable production methods are, for example, extrusion or drawing methods, in which a suitable blank, for example a wire of suitable thickness is pressed or drawn through a die, the die defining the final outer shape of the tappet pushrod 33.

The design according to the invention of an electromagnetic actuation unit 2 may, of course, also be employed in hydraulic valves 1, in which the valve portion 3 is not connected firmly to the actuation unit 2, but, instead, is arranged without a firm connection in the axial direction with respect to the actuation unit 2. Hydraulic valves 1 of this type are used, for example, as a central valve for camshaft adjusters, in which the valve portion 3 is arranged within a camshaft and rotates with the latter, while the actuation unit 2 is fastened in the axial direction with respect to it, for example to a cylinder head or a cylinder-head cover.

REFERENCE SYMBOLS

1 hydraulic valve
2 actuation unit
3 valve portion
4 coil former
4*a* coil carrier
4*b* closing body
4*c* connecting element
5 annular groove
6 sealing element
7 coil
8 material layer
9 plug connection
10 recess
11 first magnet yoke
12 armature guide sleeve
13 stop
14 housing
14*a* introduction orifice
14*b* first region
14*c* introduction chamfer
14*d* second region
15 tab
16 armature
17 second magnet yoke
18 tubular portion
19 annular portion
20 bottom
21 orifice
22 mounting flange
23 bore
24 edge
25 caulking
26 sealing ring
27 valve housing
28 control piston
30 clearances
31 control portion
32 spring element
33 tappet pushrod
35 first subspace
36 second subspace
37 sliding sleeve
38 rim
39 bearing face
40 groove
P inflow connection
T tank connection
A first working connection
B second working connection
d thickness

The invention claimed is:

1. An electromagnetic actuation unit of a hydraulic valve, comprising:

a housing; a closing body; and a sealing element, the sealing element being arranged in an annular groove formed on the closing body, the closing body being plugged into an insertion opening of the housing, the housing having a sleeve-shaped region which, starting from the insertion opening of the housing, has a first and an adjacent second axial region, an internal diameter of the first region being of greater configuration than an internal diameter of the second region, the sealing element bearing against the closing body and the second region of the housing, and the first region merging into the second region by means of an insertion bevel, wherein the internal diameter of the first region is greater than an external diameter of the sealing element, but smaller than the external diameter of the closing body which is increased by a radial thickness of a material of a relieved sealing element.

2. The electromagnetic actuation unit according to claim 1, wherein the housing is a formed sheet-metal part which is manufactured without cutting.

3. The electromagnetic actuation unit according to claim 1, wherein the first region has an external diameter and the second region has an external diameter, and the external diameter of the first region corresponds to the external diameter of the second region.

* * * * *